United States Patent
Sai

(10) Patent No.: US 11,218,905 B2
(45) Date of Patent: Jan. 4, 2022

(54) BASE STATION DEVICE, PROGRAM, CONTROL DEVICE AND CONTROL METHOD

(71) Applicant: HAPSMobile Inc., Tokyo (JP)

(72) Inventor: Jutatsu Sai, Kanagawa (JP)

(73) Assignee: HAPSMobile Inc., Tokyo (JP)

( * ) Notice: Subject to any disclaimer, the term of this patent is extended or adjusted under 35 U.S.C. 154(b) by 0 days.

(21) Appl. No.: 17/211,885

(22) Filed: Mar. 25, 2021

(65) Prior Publication Data

US 2021/0211929 A1 Jul. 8, 2021

Related U.S. Application Data

(63) Continuation of application No. PCT/JP2019/031745, filed on Aug. 9, 2019.

(30) Foreign Application Priority Data

Oct. 18, 2018 (JP) ............................. JP2018-196551

(51) Int. Cl.
| | |
|---|---|
| *G06F 11/00* | (2006.01) |
| *H04W 28/02* | (2009.01) |
| *H04B 7/185* | (2006.01) |
| *H04W 24/10* | (2009.01) |

(52) U.S. Cl.
CPC .... *H04W 28/0289* (2013.01); *H04B 7/18504* (2013.01); *H04W 24/10* (2013.01)

(58) Field of Classification Search
CPC . H04W 28/0289; H04W 24/10; H04W 84/06; H04W 48/06; H04B 7/18504

USPC .............................. 370/235, 235.1, 230, 230.1
See application file for complete search history.

(56) References Cited

U.S. PATENT DOCUMENTS

| | | | |
|---|---|---|---|
| 5,752,189 A | 5/1998 | Ueno | |
| 2005/0089042 A1* | 4/2005 | Ruutu | H04L 47/2408 370/395.21 |
| 2013/0148504 A1* | 6/2013 | Ungureanu | H04L 47/17 370/235 |
| 2017/0257779 A1 | 9/2017 | Zerick | |

(Continued)

FOREIGN PATENT DOCUMENTS

| | | |
|---|---|---|
| DE | 102015219785 A1 | 4/2017 |
| EP | 2605461 A1 | 6/2013 |

(Continued)

OTHER PUBLICATIONS (ISA/237) Written Opinion of the International Search Authority for International Patent Application No. PCT/JP2019/031745, mailed by the Japan Patent Office dated Nov. 5, 2019.

(Continued)

*Primary Examiner* — Chuong T Ho

(57) ABSTRACT

Provided is a base station device mounted on an aircraft and configured to form a communication area on the ground to provide wireless communication service for a user terminal in the communication area. The base station device comprises a CPU; a determination unit configured to determine whether to execute congestion control in the wireless communication service, based on a use status of a CPU stack message queue of the CPU; and a congestion control execution unit that executes the congestion control when the determination unit determines to execute the congestion control.

19 Claims, 6 Drawing Sheets

(56) References Cited

U.S. PATENT DOCUMENTS

| | | | |
|---|---|---|---|
| 2018/0131613 A1* | 5/2018 | Fraser | H04L 47/12 |
| 2018/0310200 A1 | 10/2018 | Buburuzan | |
| 2019/0103913 A1* | 4/2019 | Cooper | H04L 43/16 |
| 2019/0104132 A1* | 4/2019 | Cooper | H04W 72/082 |

FOREIGN PATENT DOCUMENTS

| | | |
|---|---|---|
| JP | H07298340 A | 11/1995 |
| JP | 2002211496 A | 7/2002 |
| JP | 2015103845 A | 6/2015 |
| WO | 2015111929 A1 | 7/2015 |

OTHER PUBLICATIONS

Extended European Search Report for counterpart European Application No. 19873060.8, issued by the European Patent Office dated Oct. 21, 2021.

* cited by examiner

BASE STATION DEVICE, PROGRAM, CONTROL DEVICE AND CONTROL METHOD

The contents of the following Japanese and PCT applications are incorporated herein by reference:
NO. 2018-196551 filed in JP on Oct. 18, 2018 and
NO. PCT/JP2019/031745 filed in WO on Aug. 9, 2019

BACKGROUND

1. Technical Field

The present invention relates to a base station device, a program, a control device and a control method.

2. Related Art

Known is an aircraft that includes an antenna and flies in the stratosphere, so as to provide a stratosphere platform (for example, refer to Patent Document 1).

CITATION LIST

Patent Document

Patent Document 1: Japanese Patent Application Publication No. 2002-211496

DESCRIPTION OF EXEMPLARY EMBODIMENTS

Hereinafter, the present invention will be described through embodiments of the invention. However, the following embodiments do not limit the invention defined in the claims. Also, all combinations of features described in the embodiments are not necessarily essential to solutions of the invention.

Figure 1:
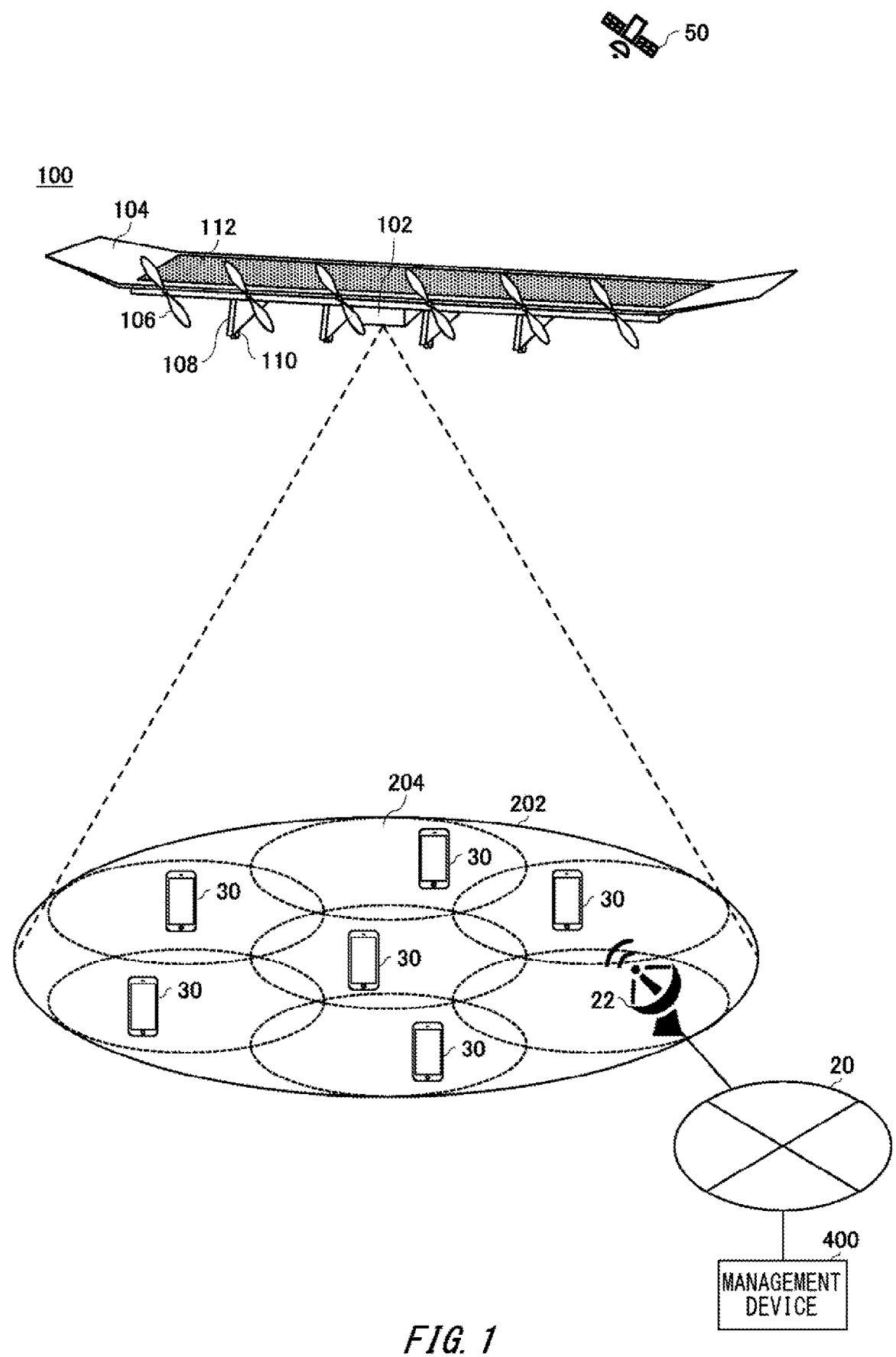
FIG. 1 shows schematically an example of an aircraft 100.

FIG. 1 shows schematically an example of an aircraft 100. The aircraft 100 includes a main body 102, a main wing 104, propellers 106, skids 108, wheels 110, and a solar cell panel 112.

The main body 102 includes a battery, a flight control device, and a base station device, which are not shown. The battery is configured to store electric power generated by the solar cell panel 112. The flight control device is configured to control flight of the aircraft 100. The flight control device is configured to cause the aircraft 100 to fly by rotating the propellers 106 with the electric power stored in the battery, for example. The base station device has an antenna for forming a communication area 202 on the ground to provide wireless communication service for user terminals 30 in the communication area 202. The antenna may be, for example, a multi-beam antenna. The communication area 202 may be configured by a plurality of sub-cells 204. The communication area 202 may also be configured by a single cell. The flight control device and the base station device may also be integrated.

The aircraft 100 is configured to fly in the stratosphere to provide wireless communication service for the user terminals 30 on the ground, for example. The aircraft 100 may function as a stratosphere platform.

The user terminal 30 may be any communication terminal as long as it can communicate with the aircraft 100. For example, the user terminal 30 is a mobile phone such as a smartphone. The user terminal 30 may also be a tablet terminal, a PC (Personal Computer) and the like. The user terminal 30 may also be a so-called IoT (Internet of Thing) device. Examples of the IoT device may include diverse sensors, diverse actuators and the like. The user terminal 30 may also be a communication module mounted on a vehicle, a ship, a drone and the like. The user terminal 30 may include all things corresponding to so-called IoE (Internet of Everything).

The aircraft 100 is configured to cover a ground area of a cover target by the communication area 202 while circling over the ground area, for example. The circling of the aircraft 100 over the ground area may also be referred to as stationary flight. The aircraft 100 is also configured to cover the entire ground area by moving over the ground area while covering a part of the ground area of a cover target by the communication area 202, for example.

The aircraft 100 is configured to provide wireless communication service for the user terminal 30 by relaying communication between the user terminal 30 and a network 20 on the ground, for example. The network 20 may be any network, and may include, for example, at least any of the Internet, a mobile phone network such as so-called 3G (3rd Generation), LTE (Long Term Evolution), 4G (4th Generation) and 5G (5th Generation), an public wireless LAN (Local Area Network), and a dedicated network.

The aircraft 100 is configured to communicate with the network 20 on the ground via a gateway 22 in the communication area 202 of gateways 22 arranged in each region on the ground, for example. The aircraft 100 is also configured to communicate with the network 20 on the ground via a communication satellite 50, for example. In this case, the aircraft 100 has an antenna for communicating with the communication satellite 50.

The aircraft 100 is also configured to communicate with other aircrafts. The aircraft 100 is configured to communicate with other aircrafts via the network 20, for example. The aircraft 100 is also configured to communicate with other aircrafts via the communication satellite 50, for example. The aircraft 100 may also be configured to wirelessly communicate with other aircrafts. The aircraft 100 may also be configured to directly communicate with other aircrafts by wireless communication. In this case, the aircraft 100 has an antenna for wirelessly communicating with other aircrafts. The aircraft 100 may also be configured to form a C2 link with other aircrafts by using the antenna, and to perform communication via the C2 link, for example.

The aircraft 100 may also be controlled by a management device 400 on the ground. The aircraft 100 is configured to fly or to form the communication area 202, according to an instruction transmitted via the network 20 and the gateway 22 by the management device 400, for example. The management device 400 may also be configured to transmit an instruction to the aircraft 100 via the communication satellite 50.

The management device 400 is configured to control the aircraft 100 by transmitting an instruction. The management device 400 may also be configured to cause the aircraft 100 to fly over a target area on the ground so as to cause the communication area 202 to cover the target area. The management device 400 may be configured to cause the aircraft 100 to fly over each of a plurality of target areas so as to cover each of the plurality of target areas.

The management device 400 may be configured to manage ground area-related information relating to a ground area that the aircraft 100 covers by the communication area 202. The ground area-related information includes, for example, an event holding situation such as a concert at which many people can gather, in the ground area. The ground area-related information may also include a disaster occurrence situation in the ground area. The ground area-related information may also include an arrangement situation of mobile networks on the ground in the ground area. The management device 400 may also be configured to transmit the ground area-related information to the aircraft 100.

In a mobile network on the ground of the related art, a CPU use rate of a CPU (Central Processing Unit) of a wireless base station is used as a determination reference of CAPS (Call Attempt Per Second) congestion control of the wireless base station. However, in a case where the communication area 202 is formed from the sky, like the aircraft 100 of the present embodiment, since an area coverage is extremely wide, as compared to the mobile network on the ground, the number of the user terminals 30 to be accommodated is large and simultaneous user connection (handover) is likely to occur at a boundary with an adjacent area due to fluctuation of a coverage area (footprint). For this reason, for further optimal congestion control, congestion control considering variation in number of simultaneous connections is required. However, the determination is difficult only with the CPU use rate of the related art.

In contrast, the aircraft 100 of the present embodiment is configured to determine whether to execute CAPS congestion control in wireless communication service by the communication area 202, based on a use status of a CPU stack message queue. For example, when a number of messages held in the CPU stack message queue is smaller than a predetermined number, the aircraft 100 does not execute the congestion control, irrespective of the CPU use rate.

In the processing of the base station device, connection processing with the user terminal 30 has a higher processing load. Therefore, while executing the connection processing with the user terminal 30, the CPU use rate tends to increase. For example, when the connection processing with the user terminal 30 starts in a state where the CPU stack message queue is empty, the CPU use rate is high even though there is a margin in the CPU stack message queue. In the configuration where it is determined whether to execute the congestion control, only based on the CPU use rate, like the related art, the congestion control is executed, in this state. For this reason, even though there is a margin in the CPU stack message queue, a situation where the user terminal 30 cannot establish communication connection with the aircraft 100 may occur.

In contrast, according to the aircraft 100 of the present embodiment, when the number of messages held in the CPU stack message queue is smaller than the predetermined number, the congestion control may not be executed even though the CPU use rate is high. Thereby, it is possible to suppress the situation as described above.

In addition, according to the aircraft 100 of the present embodiment, in a case where the number of messages held in the CPU stack message queue is larger than the predetermined number, when the CPU use rate is lower than a predetermined threshold value, the congestion control of a first level is executed, and when the CPU use rate is higher than the threshold value, the congestion control of a second level higher than the first level is executed. Thereby, it is possible to execute the appropriate congestion control according to the CPU use rate.

Figure 2:
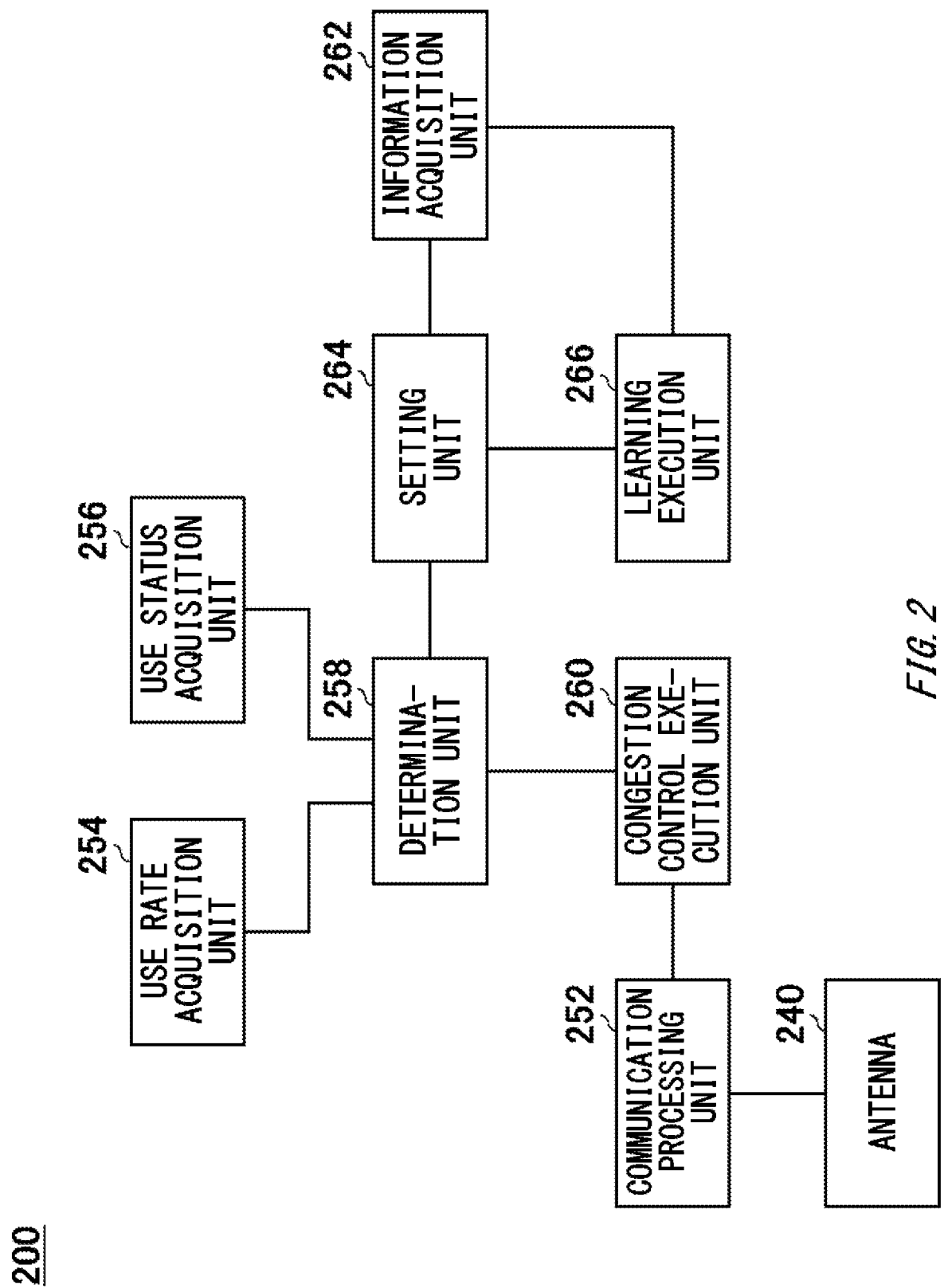
FIG. 2 shows schematically an example of a functional configuration of a base station device 200 provided to a main body 102.

FIG. 2 shows schematically an example of a functional configuration of the base station device 200 provided to the main body 102. The base station device 200 includes a communication processing unit 252, a use rate acquisition unit 254, a use status acquisition unit 256, a determination unit 258, a congestion control execution unit 260, an information acquisition unit 262, a setting unit 264, and a learning execution unit 266. Note that, it is not necessarily required for the base station device 200 to have all the configurations.

The communication processing unit 252 is configured to execute a variety of communication processing. The communication processing unit 252 is configured to form the communication area 202 on the ground by using an antenna 240. The communication processing unit 252 is configured to communicate with the network 20 via the gateway 22 in the communication area 202. The communication processing unit 252 is configured to communicate with the management device 400 via the gateway 22 and the network 20, for example. The communication processing unit 252 is also configured to communicate with the user terminal 30 in the communication area 202. The communication processing unit 252 is configured to relay communication of the user terminal 30 in the communication area 202. In a case where the aircraft 100 has an antenna for communicating with the communication satellite 50, the aircraft 100 may also be configured to communicate with the communication satellite 50 by using the antenna.

The use rate acquisition unit 254 is configured to acquire a CPU use rate of a CPU of the base station device 200. The use rate acquisition unit 254 is configured to acquire the CPU use rate from an OS (Operating System) of the base station device 200, for example.

The use status acquisition unit 256 is configured to acquire a use status of the CPU stack message queue of the CPU of the base station device 200. The use status of the CPU stack message queue may indicate the number of messages held in the CPU stack message queue. The use status of the CPU stack message queue may also indicate a use rate of the CPU stack message queue. The use status acquisition unit 256 is configured to acquire the use status of the CPU stack message queue from the OS of the base station device 200, for example.

The determination unit 258 is configured to determine whether to execute the congestion control in wireless communication service provided for the user terminal 30 by the communication processing unit 252, based on the use status of the CPU stack message queue acquired by the use status acquisition unit 256.

For example, when the number of messages held in the CPU stack message queue is smaller than the predetermined number, the determination unit 258 determines not to execute the congestion control, and when the number of messages held in the CPU stack message queue is larger than the predetermined number, the determination unit 258 determines to execute the congestion control. When the number of messages held in the CPU stack message queue is smaller than the predetermined number, the determination unit 258 may determine not to execute the congestion control, irrespective of the CPU use rate. When the use rate acquisition unit 254 acquires the use rate of the CPU stack message queue, the determination unit 258 may determine whether the number of messages held in the CPU stack message queue is larger than the predetermined number by determining whether the use rate is greater than a predetermined value.

The determination unit 258 may be configured to determine an execution level of the congestion control, based on the CPU use rate acquired by the use rate acquisition unit 254. For example, in a case where the number of messages held in the CPU stack message queue is larger than the predetermined number, when the CPU use rate is lower than a predetermined first threshold value, the determination unit 258 determines to execute the congestion control of the first level, and when the CPU use rate is higher than the first threshold value, the determination unit 258 determines to execute the congestion control of the second level higher than the first level. The first threshold value may be arbitrarily set and may also be changed.

In a case where the number of messages held in the CPU stack message queue is larger than the predetermined number, when the CPU use rate is lower than the first threshold value, the determination unit 258 may determine to execute the congestion control of the first level, when the CPU use rate is higher than the first threshold value and lower than the second threshold value higher than the first threshold value, the determination unit 258 may determine to execute the congestion control of a third level higher than the first level and lower than the second level, and when the CPU use rate is higher than the second threshold value, the determination unit 258 may determine to execute the congestion control of the second level. The first threshold value and the second threshold value may be arbitrarily set and may also be changed as long as the second threshold value is greater than the first threshold value.

When the determination unit 258 determines to execute the congestion control, the congestion control execution unit 260 executes the congestion control. For example, the congestion control execution unit 260 sets different CAPS values and executes the congestion control when the determination unit 258 determines to execute the congestion control of the first level and when the determination unit 258 determines to execute the congestion control of the second level. The CAPS value may be a connection tolerance number per unit time.

For example, when the determination unit 258 determines to execute the congestion control of the first level, the congestion control execution unit 260 sets the connection tolerance number per unit time to a first number, and when the determination unit 258 determines to execute the congestion control of the second level, the congestion control execution unit 260 sets the connection tolerance number per unit time to a second number smaller than the first number. As a specific example, in a case where the CAPS value is 100 accesses/second when the congestion control is not executed, the congestion control execution unit 260 sets the CAPS value in the congestion control of the first level to 30 accesses/second, and sets the CAPS value in the congestion control of the second level to 1 access/second. That is, the first number is set to 30, and the second number is set to 1. The first number and the second number may be arbitrarily set as long as they are smaller than an access tolerance number per unit time when the congestion control is not executed and the second number is smaller than the first number.

The congestion control execution unit 260 may set different control contents when the determination unit 258 determines to execute the congestion control of the first level and when the determination unit 258 determines to execute the congestion control of the second level. For example, in the congestion control of the first level, only adjustment of the CAPS value is performed, and in the congestion control of the second level, at least any of HO-IN Rejection and Measurements Reports discarded is performed. In the congestion control of the second level, the adjustment of the CAPS value and at least any of HO-IN Rejection and Measurements Reports discarded may also be performed. HO-IN Rejection may refer to reject to accept handover of the user terminal 30. Measurements Reports discarded may refer to discard Measurement Report received from the user terminal 30 without processing the same.

By the above configuration, when executing the congestion control, if the CPU use rate is lower than the threshold value, only the adjustment of the CAPS value is performed to prevent connection of the user terminal 30 from being rejected beyond necessity, and if the CPU use rate exceeds the threshold value, the CAPS value is reduced and at least any of HO-IN Rejection and Measurements Reports discarded is performed to prevent excessive load from being applied to the base station device 200.

For example, the congestion control execution unit 260 may set different CAPS values and execute the congestion control, when the determination unit 258 determines to execute the congestion control of the first level, when the determination unit 258 determines to execute the congestion control of the second level, and when the determination unit 258 determines to execute the congestion control of the third level. For example, when the determination unit 258 determines to execute the congestion control of the first level, the congestion control execution unit 260 sets the connection tolerance number per unit time to the first number, when the determination unit 258 determines to execute the congestion control of the second level, the congestion control execution unit 260 sets the connection tolerance number per unit time to the second number smaller than the first number, and when the determination unit 258 determines to execute the congestion control of the third level, the congestion control execution unit 260 sets the connection tolerance number per unit time to a number between the first number and the second number.

The congestion control execution unit 260 may set different control contents when the determination unit 258 determines to execute the congestion control of the first level, when the determination unit 258 determines to execute the congestion control of the second level, and when the determination unit 258 determines to execute the congestion control of the third level. For example, in the congestion control of the first level, the connection tolerance number per unit time is set to the first number, in the congestion control of the third level, the connection tolerance number per unit time is set to the second number smaller than the first number, and in the congestion control of the second level, the connection tolerance number per unit time is set to the second number and at least any of HO-IN Rejection and Measurements Reports discarded is executed.

The information acquisition unit 262 is configured to acquire a variety of information. The information acquisition unit 262 may be configured to acquire a history of communication traffic in wireless communication service provided by the aircraft 100. The information acquisition unit 262 may be configured to acquire the history from the communication processing unit 252.

The information acquisition unit 262 is also configured to acquire the ground area-related information relating to the ground area that the aircraft 100 covers by the communication area 202, for example. The information acquisition unit 262 may also be configured to acquire the ground area-related information from the management device 400. The information acquisition unit 262 is also configured to acquire a remaining battery level of the battery mounted on the aircraft 100, for example.

The setting unit 264 is configured to set a number (which may also be referred to as a message threshold value) for comparison with the number of messages held in the CPU stack message queue acquired by the use status acquisition unit 256. The setting unit 264 is also configured to set a threshold value (which may also be referred to as a use rate threshold value) for comparison with the CPU use rate acquired by the use rate acquisition unit 254. The setting unit 264 may also be configured to set the message threshold value and the use rate threshold value, according to an instruction by an administrator of at least any of the aircraft 100 and the base station device 200.

The setting unit 264 may also be configured to set the use rate threshold value based on the information acquired by the information acquisition unit 262. For example, when the information acquired by the information acquisition unit 262 satisfies a predetermined condition, the setting unit 264 changes the use rate threshold value. The setting unit 264 may also be configured to set the message threshold value based on the information acquired by the information acquisition unit 262. For example, when the information acquired by the information acquisition unit 262 satisfies the predetermined condition, the setting unit 264 changes the message threshold value.

For example, when the ground area-related information acquired by the information acquisition unit 262 satisfies the predetermined condition, the setting unit 264 changes the message threshold value. As a specific example, when an event is held in the ground area that is covered by the communication area 202, the setting unit 264 reduces the message threshold value. Thereby, the congestion control can be preset to run faster in a situation where a request for connection is expected to occur frequently by the event.

When a disaster occurs in the ground area that is covered by the communication area 202, the setting unit 264 increases the message threshold value. Thereby, it is possible to make it difficult to execute the congestion control so that more user terminals 30 can establish communication connection with the aircraft 100.

When a mobile network on the ground is arranged in the ground area that is covered by the communication area 202, the setting unit 264 reduces the message threshold value. Thereby, the congestion control is caused to run faster, so that it can be actively complemented to the mobile network on the ground.

When a remaining battery level of the battery mounted on the aircraft 100 is smaller than a predetermined threshold value, the setting unit 264 reduces the message threshold value. Thereby, the congestion control is caused to run earlier, so that the processing load of the base station device 200 can be reduced to reduce the consumption of the battery.

The learning execution unit 266 is configured to generate prediction data for predicting a trend of communication traffic by machine learning based on the history of communication traffic acquired by the information acquisition unit 262. For example, the learning execution unit 266 may be configured to analyze the history of communication traffic for each season, for each time and for each location and to perform the machine learning, thereby generating the prediction data for predicting a trend of communication traffic for each season, for each time and for each location.

The setting unit 264 may also be configured to set at least any of the message threshold value and the use rate threshold value based on the prediction data generated by the learning execution unit 266. For example, when it is predicted by the prediction data that the communication traffic will increase, the setting unit 264 reduces the message threshold value. Thereby, the congestion control can be preset to run faster in a situation where a request for connection is expected to occur frequently.

The message threshold value and the use rate threshold value set by the setting unit 264 may be transmitted to another aircraft 100. For example, in a case where the aircraft 100 having the communication processing unit 252 mounted thereon covers a first ground area and interchanges with another aircraft 100 for the cover of the first ground area, the communication processing unit 252 transmits the message threshold value and the use rate threshold value to another aircraft 100. Thereby, the message threshold value and the use rate threshold value suitable for the first ground area can be taken over by another aircraft 100 to be interchanged.

Figure 3:
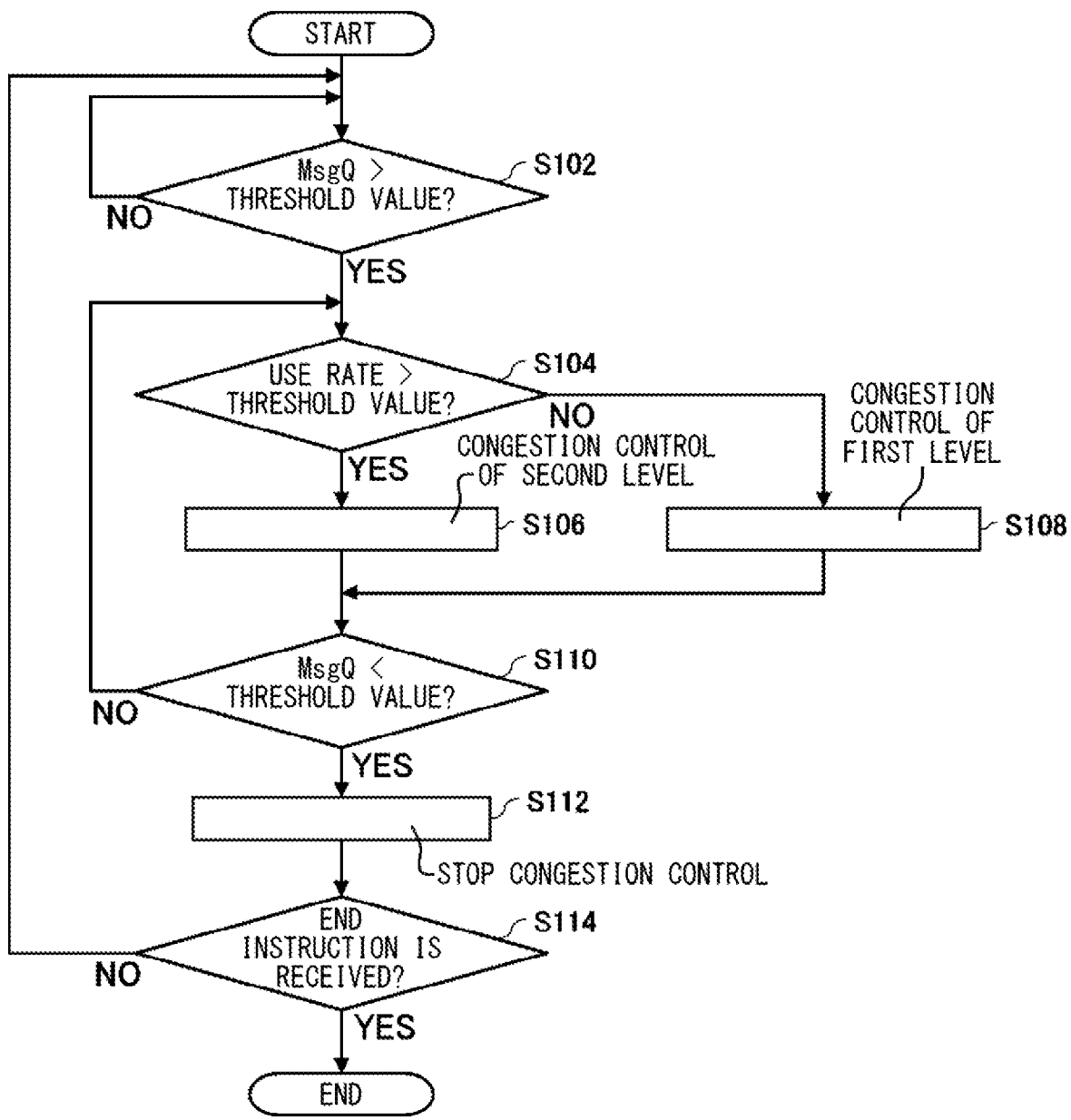
FIG. 3 shows schematically an example of a flow of processing that is executed by the base station device 200.

FIG. 3 shows schematically an example of processing that is executed by the base station device 200. Here, a flow of processing that is executed by the determination unit 258 and the congestion control execution unit 260 in a situation where the use rate acquisition unit 254 acquires periodically the CPU use rate and the use status acquisition unit 256 acquires periodically the number of messages held in the CPU stack message queue (which may also be referred to as MsgQ) is described.

In step (step may be abbreviated as S) 102, the determination unit 258 determines whether the MsgQ is larger than the message threshold value. When it is determined that the MsgQ is larger than the message threshold value, the flow proceeds to S104.

In S104, the determination unit 258 determines whether the CPU use rate is higher than the use rate threshold value. When it is determined that the CPU use rate is higher than the use rate threshold value, the flow proceeds to S106, and when it is determined that the CPU use rate is lower than the use rate threshold value, the flow proceeds to S108.

In S106, the congestion control execution unit 260 controls to execute the congestion control of the second level. In S108, the congestion control execution unit 260 controls to execute the congestion control of the first level lower than the second level.

In S110, the determination unit 258 determines whether the MsgQ is smaller than the message threshold value. When it is determined that the MsgQ is not smaller than the message threshold value, the flow returns to S104, and when it is determined that the MsgQ is smaller than the message threshold value, the flow proceeds to S112.

In S112, the congestion control execution unit 260 stops the congestion control. In S114, the determination unit 258 determines whether an end instruction has been received. When it is determined that an end instruction has not been received, the flow returns to S102, and when it is determined that an end instruction has been received, the processing is over.

Figure 4:
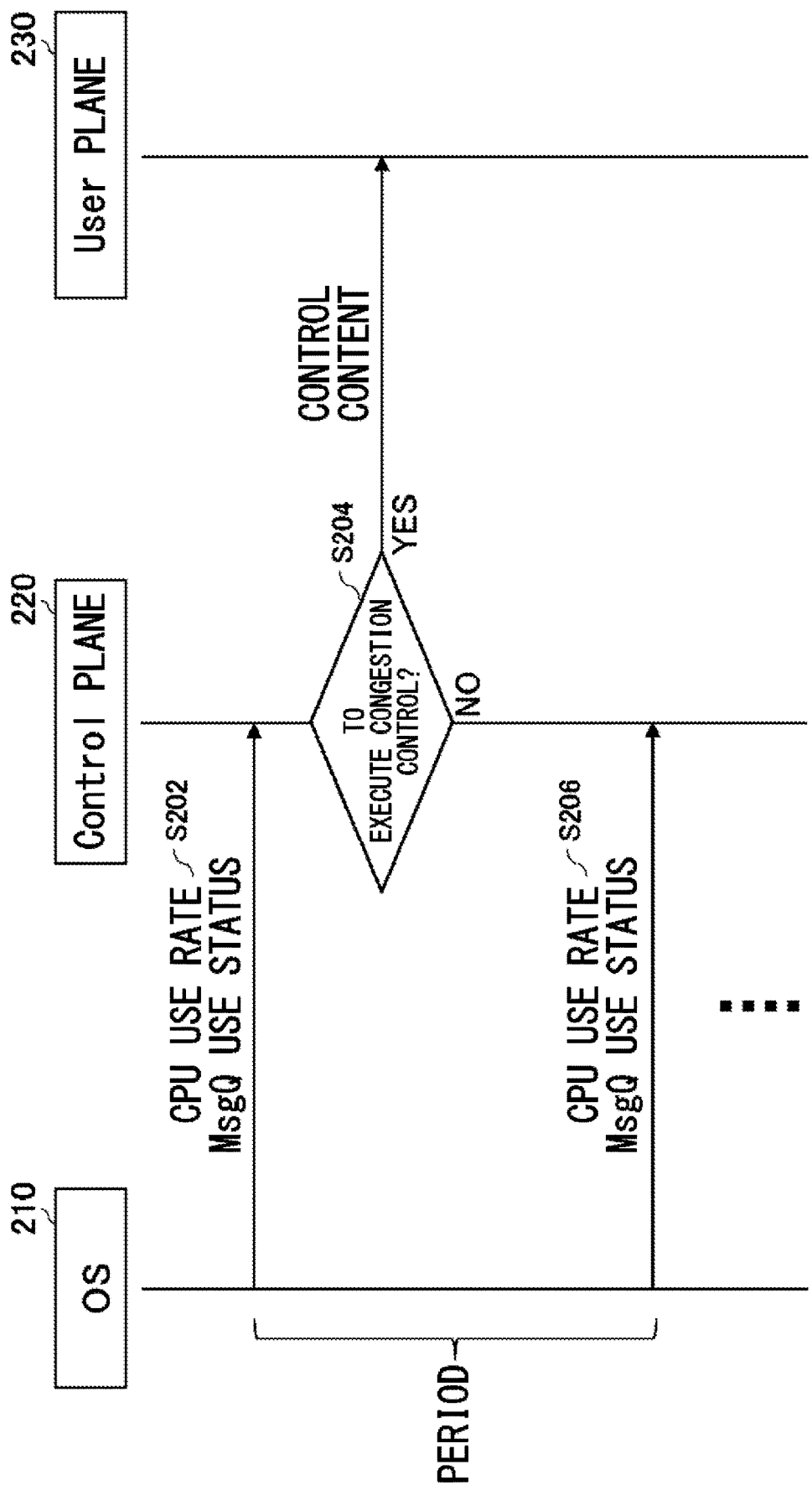
FIG. 4 shows schematically an example of a flow of processing that is executed by the base station device 200.

FIG. 4 shows schematically an example of processing that is executed by the base station device 200. Here, a flow of processing that is executed among the OS 210 in the base station device 200, a Control plane 220 and a User plane 230 is shown.

In S202, the OS 210 notifies the CPU use rate and the MsgQ use status to the Control plane 220. In S204, the Control plane 220 determines whether to execute the congestion control, and when it is determined to execute the congestion control, the Control plane 220 notifies a control content to the User plane 230.

In S206, the OS 210 notifies the CPU use rate and the MsgQ use status to the Control plane 220 according to a predetermined period. According to the above flow, the base station device 200 executes the congestion control.

In the above embodiment, the example where the base station device 200 executes the congestion control based on the use status of the CPU stack message queue and the CPU use rate has been described. However, the present invention is not limited thereto. The congestion control of the base station device 200 may be managed by a control device other than the base station device 200, such as a flight control device mounted on the aircraft 100.

Figure 5:
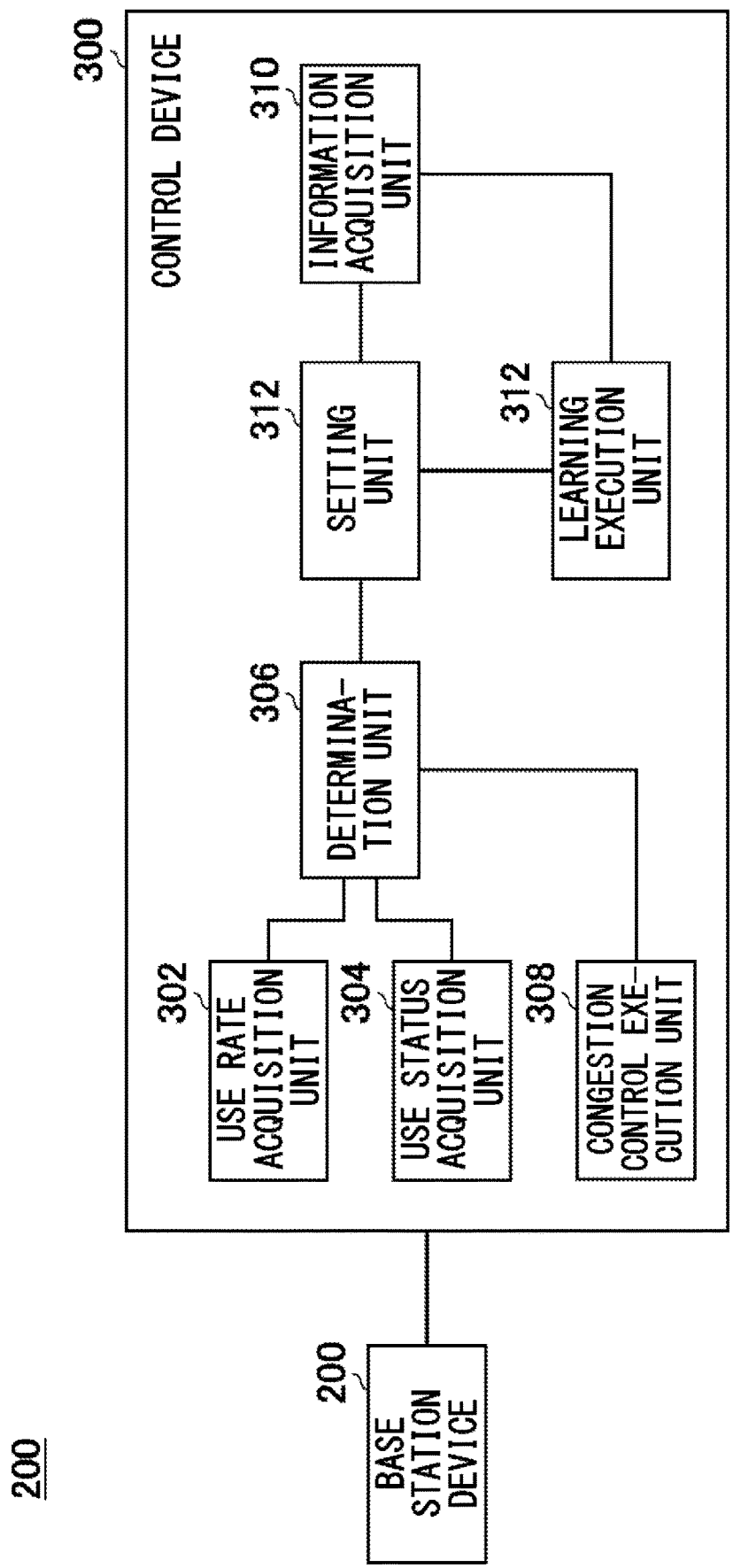
FIG. 5 shows schematically an example of a functional configuration of a control device 300.

FIG. 5 shows schematically an example of a functional configuration of a control device 300 configured to execute the congestion control of the base station device 200. The configuration shown in FIG. 5 may be a part of the flight control device. The control device 300 shown in FIG. 5 may also be mounted on the aircraft 100, separately from the flight control device.

The control device 300 includes a use rate acquisition unit 302, a use status acquisition unit 304, a determination unit 306, a congestion control execution unit 308, an information acquisition unit 310, a setting unit 312, and a learning execution unit 314. Here, differences from the use rate acquisition unit 254, the use status acquisition unit 256, the determination unit 258, the congestion control execution unit 260, the information acquisition unit 262, the setting unit 264 and the learning execution unit 266 are mainly described.

The use rate acquisition unit 302 is configured to acquire the CPU use rate of the CPU of the base station device 200. The use rate acquisition unit 302 is configured to receive the CPU use rate from the OS (Operating System) of the base station device 200, for example.

The use status acquisition unit 304 is configured to acquire the use status of the CPU stack message queue of the CPU of the base station device 200. The use status acquisition unit 304 is configured to receive the use status of the CPU stack message queue from the OS of the base station device 200, for example.

The determination unit 306 is configured to determine whether to execute the congestion control in wireless communication service provided for the user terminal 30 by the base station device 200, based on the use status of the CPU stack message queue acquired by the use status acquisition unit 304.

For example, when the number of messages held in the CPU stack message queue is smaller than the predetermined number, the determination unit 306 determines not to execute the congestion control, and when the number of messages held in the CPU stack message queue is larger than the predetermined number, the determination unit 306 determines to execute the congestion control. When the number of messages held in the CPU stack message queue is smaller than the predetermined number, the determination unit 306 may determine not to execute the congestion control, irrespective of the CPU use rate. When the use status acquisition unit 304 acquires the use rate of the CPU stack message queue, the determination unit 306 may determine whether the number of messages held in the CPU stack message queue is larger than the predetermined number by determining whether the use rate is greater than a predetermined value.

The determination unit 306 may be configured to determine an execution level of the congestion control, based on the CPU use rate acquired by the use rate acquisition unit 302. For example, in a case where the number of messages held in the CPU stack message queue is larger than the predetermined number, when the CPU use rate is lower than a predetermined first threshold value, the determination unit 306 determines to execute the congestion control of the first level, and when the CPU use rate is higher than the first threshold value, the determination unit 306 determines to execute the congestion control of the second level higher than the first level. The first threshold value may be arbitrarily set and may also be changed.

In a case where the number of messages held in the CPU stack message queue is larger than the predetermined number, when the CPU use rate is lower than the first threshold value, the determination unit 306 may determine to execute the congestion control of the first level, when the CPU use rate is higher than the first threshold value and lower than the second threshold value higher than the first threshold value, the determination unit 306 may determine to execute the congestion control of a third level higher than the first level and lower than the second level, and when the CPU use rate is higher than the second threshold value, the determination unit 306 may determine to execute the congestion control of the second level. The first threshold value and the second threshold value may be arbitrarily set and may also be changed as long as the second threshold value is greater than the first threshold value.

When the determination unit 306 determines to execute the congestion control, the congestion control execution unit 308 causes the base station device 200 to execute the congestion control. For example, the congestion control execution unit 308 sets different CAPS values when the determination unit 306 determines to execute the congestion control of the first level and when the determination unit 258 determines to execute the congestion control of the second level, and causes the base station device 200 to execute the congestion control. The congestion control execution unit 308 may set different control contents when the determination unit 306 determines to execute the congestion control of the first level and when the determination unit 306 determines to execute the congestion control of the second level.

For example, the congestion control execution unit 308 may set different CAPS values and execute the congestion control when the determination unit 306 determines to execute the congestion control of the first level, when the determination unit 306 determines to execute the congestion control of the second level, and when the determination unit 306 determines to execute the congestion control of the third level. The congestion control execution unit 308 may set different control contents when the determination unit 306 determines to execute the congestion control of the first level, when the determination unit 306 determines to execute the congestion control of the second level and when the determination unit 306 determines to execute the congestion control of the third level.

The information acquisition unit 310 is configured to acquire a variety of information. The information acquisition unit 310 may be configured to acquire a history of communication traffic in wireless communication service provided by the aircraft 100. The information acquisition unit 310 may be configured to acquire the history from the base station device 200. The information acquisition unit 310 is also configured to acquire the ground area-related information relating to the ground area that the aircraft 100 covers by the communication area 202, for example. The information acquisition unit 310 may also be configured to acquire the ground area-related information from the management device 400. The information acquisition unit 310 is also configured to acquire a remaining battery level of the battery mounted on the aircraft 100, for example. The information acquisition unit 310 may also be configured to receive the remaining battery level of the battery from the aircraft 100.

The setting unit 312 is configured to set the message threshold value. The setting unit 312 is configured to set the use rate threshold value. The setting unit 312 may also be configured to set the use rate threshold value, based on the information acquired by the information acquisition unit 310. For example, when the information acquired by the information acquisition unit 310 satisfies a predetermined condition, the setting unit 312 changes the use rate threshold value. The setting unit 312 may also be configured to set the message threshold value, based on the information acquired by the information acquisition unit 310. For example, when the information acquired by the information acquisition unit 310 satisfies the predetermined condition, the setting unit 312 changes the message threshold value.

The learning execution unit 314 is configured to generate prediction data for predicting a trend of communication traffic by machine learning based on the history of communication traffic acquired by the information acquisition unit 310. The setting unit 312 may also be configured to set at least any of the message threshold value and the use rate threshold value based on the prediction data generated by the learning execution unit 314.

Figure 6:
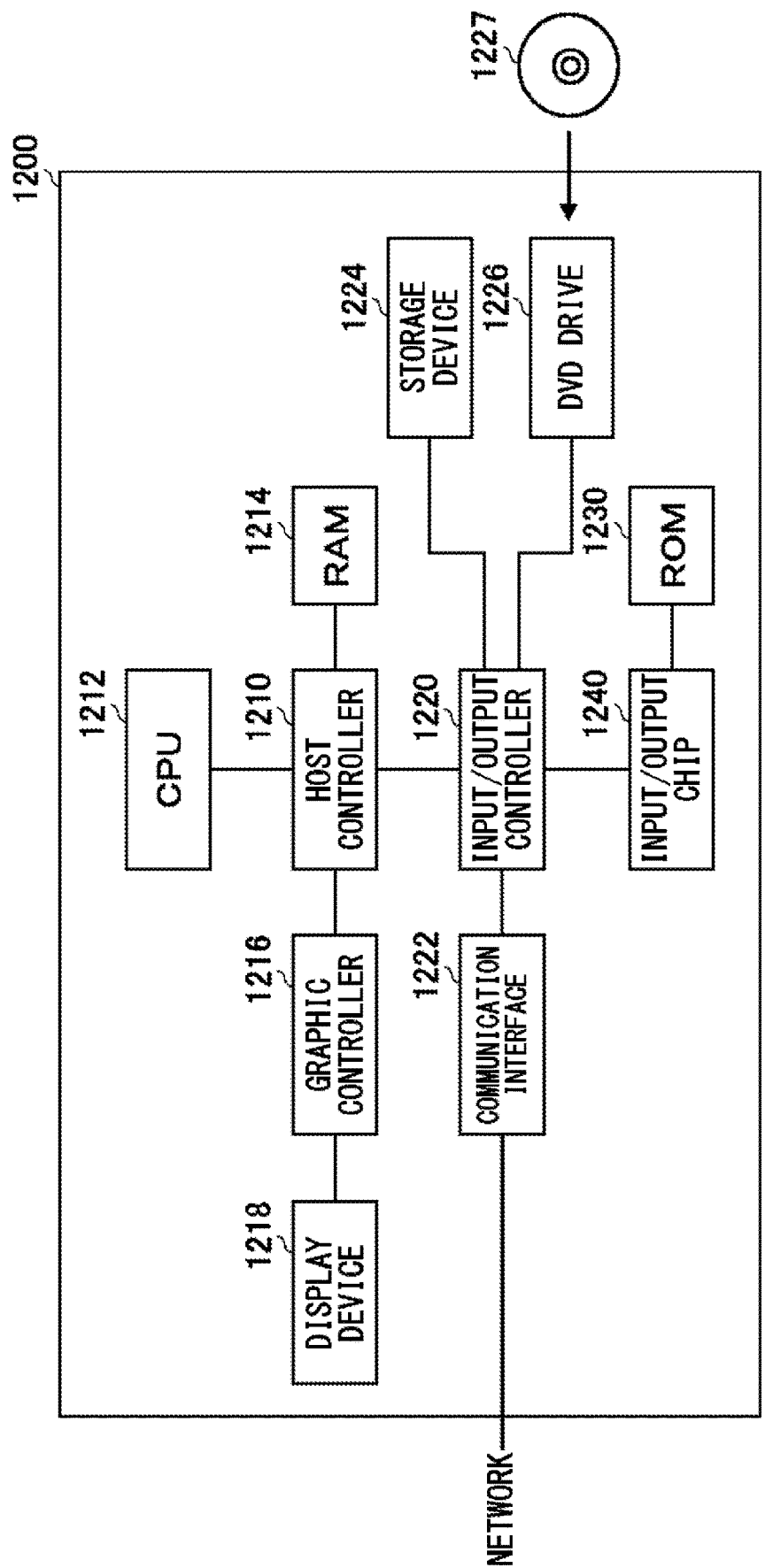
FIG. 6 shows schematically an example of a hardware configuration of a computer 1000 functioning as the base station device 200 or the control device 300.

FIG. 6 shows schematically an example of a hardware configuration of a computer 1200 functioning as the base station device 200 or the control device 300. A program that is installed in the computer 1200 can cause the computer 1200 to function as one or more "sections" in an apparatus of the embodiment of the present invention, or cause the computer 1200 to execute operations associated with the apparatus of the embodiment of the present invention or the one or more sections thereof, and/or cause the computer 1200 to execute processes of the embodiment of the present invention or steps thereof. Such program may be executed by a CPU 1212 so as to cause the computer 1200 to execute certain operations associated with some or all of the blocks of flowcharts and block diagrams described herein.

The computer 1200 in accordance with the present embodiment includes a CPU 1212, a RAM 1214, and a graphic controller 1216, which are mutually connected by a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, and the like. The storage device 1224 may be a hard disk drive, a solid-state drive, and the like. The computer 1200 also includes legacy input/output units such as a ROM 1230 and a keyboard, which are connected to the input/output controller 1220 via an input/output chip 1240.

The CPU 1212 is configured to operate according to programs stored in the ROM 1230 and the RAM 1214, thereby controlling each unit. The graphic controller 1216 is configured to acquire image data generated by the CPU 1212 on a frame buffer or the like provided in the RAM 1214 or in itself, and to cause the image data to be displayed on a display device 1218.

The communication interface 1222 is configured to communicate with other electronic devices via a network. The storage device 1224 is configured to store programs and data used by the CPU 1212 within the computer 1200. The DVD drive 1226 is configured to read the programs or the data from the DVD-ROM 1227 or the like, and to provide the storage device 1224 with the programs or the data. The IC card drive is configured to read programs and data from an IC card, and/or to write programs and data into the IC card.

The ROM 1230 is configured to store therein a boot program or the like that is executed by the computer 1200 at the time of activation, and/or a program depending on the hardware of the computer 1200. The input/output chip 1240 may also be configured to connect various input/output units to the input/output controller 1220 via a USB port, a parallel port, a serial port, a keyboard port, a mouse port and the like.

A program is provided by a computer-readable storage medium such as a DVD-ROM 1227 or an IC card. The program is read from the computer readable storage media, is installed into the storage device 1224, RAM 1214, or ROM 1230, which are also examples of computer readable storage media, and is executed by the CPU 1212. The information processing described in these programs is read into the computer 1200, resulting in cooperation between a program and the above-mentioned various types of hardware resources. An apparatus or method may be constituted by realizing the operation or processing of information in accordance with the usage of the computer 1200.

For example, when communication is performed between the computer 1200 and an external device, the CPU 1212 may execute a communication program loaded onto the RAM 1214 to instruct communication processing to the communication interface 1222, based on the processing described in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may be configured to cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. The CPU 1212 may be configured to write back the processed data to the external recording medium.

Various types of information, such as various types of programs, data, tables, and databases, may be stored in the recording medium to undergo information processing. The CPU 1212 may also be configured to execute various types of processing on the data read from the RAM 1214, which includes various types of operations, processing of information, condition judging, conditional branching, unconditional branching, search/replacement of information and the like described in the present disclosure and designated by an instruction sequence of programs, and to write the result back to the RAM 1214. The CPU 1212 may also be configured to search for information in a file, a database, etc., in the recording medium. For example, when a plurality of entries, each having an attribute value of a first attribute associated with an attribute value of a second attribute, is stored in the recording medium, the CPU 1212 may search for an entry matching the condition whose attribute value of the first attribute is designated, from the plurality of entries, and read the attribute value of the second attribute stored in the entry, thereby obtaining the attribute value of the second attribute associated with the first attribute satisfying the predetermined condition.

The above-described program or software modules may be stored in the computer readable storage media on or near the computer 1200. In addition, a recording medium such as a hard disk or a RAM provided in a server system connected to a dedicated communication network or the Internet can be used as the computer-readable storage medium, thereby providing the programs to the computer 1200 via the network.

In the present embodiment, blocks of the flowcharts and the block diagrams may represent steps of processes in which operations are executed or sections of apparatuses responsible for performing operations. Certain steps and units may be implemented by dedicated circuitry, programmable circuitry supplied with computer-readable instructions stored on computer-readable storage media, and/or processors supplied with computer-readable instructions stored on computer-readable storage media. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

Computer-readable storage media may include any tangible device that can store instructions for execution by a suitable device, such that the computer-readable storage medium having instructions stored therein comprises an article of manufacture including instructions which can be performed to create means for performing operations specified in the flowcharts or block diagrams. Examples of computer-readable storage media may include an electronic storage medium, a magnetic storage medium, an optical storage medium, an electromagnetic storage medium, a semiconductor storage medium, etc. More specific examples of computer-readable storage media may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY(registered trademark) disc, a memory stick, an integrated circuit card, etc.

Computer-readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry performs the computer-readable instructions to create means for performing operations specified in the flowcharts or block diagrams. Examples of processors include computer processors, processing units, microprocessors, digital signal processors, controllers, microcontrollers, etc.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

20: network, 22: gateway, 30: user terminal, 50: communication satellite, 100: aircraft, 102: main body, 104: main wing, 106: propeller, 108: skid, 110: wheel, 112: solar cell panel, 200: base station device, 202: communication area, 204: sub-cell, 220: Control plane, 230: User plane, 252: communication processing unit, 254: use rate acquisition unit, 256: use status acquisition unit, 258: determination unit, 260: congestion control execution unit, 262: information acquisition unit, 264: setting unit, 266: learning execution unit, 300: control device, 302: use rate acquisition unit, 304: use status acquisition unit, 306: determination unit, 308: congestion control execution unit, 310: information acquisition unit, 312: setting unit, 314: learning execution unit, 400: management device, 1200: computer, 1210: host controller, 1212: CPU, 1214: RAM, 1216: graphic controller, 1218: display device, 1220: input/output controller, 1222: communication interface, 1224: storage device, 1226: DVD drive, 1227: DVD-ROM, 1230: ROM, 1240: input/output chip

What is claimed is:

1. A base station device mounted on an aircraft and configured to form a communication area on the ground to provide wireless communication service for a user terminal in the communication area, the base station device comprising:
 a central processing unit (CPU);
 a determination unit configured to determine whether to execute congestion control in the wireless communication service, based on a use status of a CPU stack message queue of the CPU; and
 a congestion control execution unit that executes the congestion control when the determination unit determines to execute the congestion control,
 wherein the determination unit determines not to execute the congestion control when a number of messages held in the CPU stack message queue is smaller than a predetermined number, and determines to execute the congestion control when the number of messages held in the CPU stack message queue is larger than the predetermined number, and when the number of messages held in the CPU stack message queue is larger than the predetermined number, the determination unit determines to execute the congestion control of a first level if a CPU use rate of the CPU is lower than a predetermined first threshold value, and determines to execute the congestion control of a second level higher than the first level if the CPU use rate is higher than the first threshold value.

2. The base station device according to claim 1, wherein when the number of messages held in the CPU stack message queue is smaller than the predetermined number, the determination unit determines not to execute the congestion control, irrespective of a CPU use rate of the CPU.

3. The base station device according to claim 2, wherein when the number of messages held in the CPU stack message queue is larger than the predetermined number, the determination unit determines to execute the congestion control of a first level if a CPU use rate of the CPU is lower than a predetermined first threshold value, and determines to execute the congestion control of a second level higher than the first level if the CPU use rate is higher than the first threshold value.

4. The base station device according to claim 1, wherein when the determination unit determines to execute the congestion control of the first level, the congestion control execution unit sets an access tolerance number per unit time to a first number, and when the determination unit determines to execute the congestion control of the second level, the congestion control execution unit sets the access tolerance number per unit time to a second number smaller than the first number.

5. The base station device according to claim 4, wherein when the determination unit determines to execute the congestion control of the second level, the congestion control execution unit sets to reject acceptance of handover of the user terminal.

6. The base station device according to claim 5, wherein when the determination unit determines to execute the congestion control of the second level, the congestion control execution unit controls Measurement Report received from the user terminal to be discarded without processing the Measurement Report.

7. The base station device according to claim 4, wherein when the determination unit determines to execute the congestion control of the second level, the congestion control execution unit controls Measurement Report received from the user terminal to be discarded without processing the Measurement Report.

8. The base station device according to claim 1, wherein when the number of messages held in the CPU stack message queue is larger than the predetermined number, the determination unit determines to execute the congestion control of the first level if the CPU use rate is lower than the first threshold value, determines to execute the congestion control of a third level higher than the first level and lower than the second level if the CPU use rate is higher than the second threshold value.

9. A base station device mounted on an aircraft and configured to form a communication area on the ground to provide wireless communication service for a user terminal in the communication area, the base station device comprising a central processing unit (CPU);
a determination unit configured to determine whether to execute congestion control in the wireless communication service, based on a use status of a CPU stack message queue of the CPU;
a congestion control execution unit that executes the congestion control when the determination unit determines to execute the congestion control; and
a setting unit configured to set the predetermined number, wherein
the setting unit changes the predetermined number when a predetermined condition is satisfied, and
the determination unit determines not to execute the congestion control when a number of messages held in the CPU stack message queue is smaller than a predetermined number, and determines to execute the congestion control when the number of messages held in the CPU stack message queue is larger than the predetermined number.

10. The base station device according to claim 9, further comprising an information acquisition unit configured to acquire ground area-related information relating to a ground area that is covered by the communication area, wherein
the setting unit changes the predetermined number when the ground area-related information satisfies a predetermined condition.

11. The base station device according to claim 9, wherein
the setting unit changes the predetermined number when a remaining battery level of a battery mounted on the aircraft is smaller than a predetermined threshold value.

12. The base station device according to claim 9, further comprising a learning execution unit configured to generate prediction data for predicting a trend of communication traffic by machine learning based on a history of communication traffic in the wireless communication service provided by the base station device, wherein
the setting unit changes the predetermined number based on the prediction data.

13. A base station device mounted on an aircraft and configured to form a communication area on the ground to provide wireless communication service for a user terminal in the communication area, the base station device comprising
a central processing unit (CPU);
a determination unit configured to determine whether to execute congestion control in the wireless communication service, based on a use status of a CPU stack message queue of the CPU;
a congestion control execution unit that executes the congestion control when the determination unit determines to execute the congestion control; and
a setting unit configured to set the predetermined number, wherein
the setting unit changes the predetermined number when a predetermined condition is satisfied, and
wherein the determination unit determines not to execute the congestion control irrespective of a CPU use rate of the CPU when a number of messages held in the CPU stack message queue is smaller than a predetermined number.

14. The base station device according to claim 13, wherein
the setting unit changes the predetermined number when a remaining battery level of a battery mounted on the aircraft is smaller than a predetermined threshold value.

15. The base station device according to claim 13, further comprising a learning execution unit configured to generate prediction data for predicting a trend of communication traffic by machine learning based on a history of communication traffic in the wireless communication service provided by the base station device, wherein
the setting unit changes the predetermined number based on the prediction data.

16. A non-transitory computer-readable non-volatile recording medium having a program recorded thereon which, when executed by a computer, causes the computer to function as:
a determination unit configured to determine whether to execute congestion control in a wireless communication service, based on a user status of a central processing unit (CPU) stack message queue of a CPU;
a congestion control execution unit that executes the congestion control when the determination unit determines to execute the congestion control,
wherein the determination unit determines not to execute the congestion control when a number of messages held in the CPU stack message queue is smaller than a predetermined number, and determines to execute the congestion control when the number of messages held in the CPU stack message queue is larger than the predetermined number, and
when the number of messages held in the CPU stack message queue is larger than the predetermined number, the determination unit determines to execute the congestion control of a first level if a CPU use rate of the CPU is lower than a predetermined first threshold value, and determines to execute the congestion control of a second level higher than the first level if the CPU use rate is higher than the first threshold value.

17. A control device configured to control a base station device mounted on an aircraft and configured to form a communication area on the ground to provide wireless communication service for a communication terminal in the communication area, the control device comprising:
a determination unit configured to determine whether to execute congestion control in the wireless communication service, based on a use status of a central processing unit (CPU) stack message queue of a CPU of the base station device;
a congestion control execution unit configured to cause the base station device to execute the congestion control when the determination unit determines to execute the congestion control; and
a setting unit configured to set the predetermined number, wherein
the setting unit changes the predetermined number when a predetermined condition is satisfied, and
the determination unit determines not to execute the congestion control when a number of messages held in the CPU stack message queue is smaller than a predetermined number, and determines to execute the congestion control when the number of messages held in the CPU stack message queue is larger than the predetermined number.

18. A non-transitory computer-readable non-volatile recording medium having a program recorded thereon which, when executed by a computer, causes the computer to function as:
a determination unit configured to determine whether to execute congestion control in a wireless communication service, based on a use status of a central processing unit (CPU) stack message queue of a CPU of a base station device;
a congestion control execution unit configured to cause the base station device to execute the congestion control when the determination unit determines to execute the congestion control; and
a setting unit configured to set the predetermined number, wherein
the setting unit changes the predetermined number when a predetermined condition is satisfied, and
the determination unit determines not to execute the congestion control when a number of messages held in the CPU stack message queue is smaller than a predetermined number, and determines to execute the congestion control when the number of messages held in the CPU stack message queue is larger than the predetermined number.

19. A control method comprising:
determining whether to execute congestion control in wireless communication service, based on a use status of a central processing unit (CPU) stack message queue of a CPU of a base station device, the base station device being mounted on an aircraft and configured to form a communication area on the ground to provide the wireless communication service for a communication terminal in the communication area;
executing the congestion control when the congestion control is determined to be executed in the determining; and
setting a predetermined number, and changing the predetermined number when a predetermined condition is satisfied,
wherein in the determining, it is determined not to execute the congestion control when a number of messages held in the CPU stack message queue is smaller than a predetermined number, and determined to execute the congestion control when the number of messages held in the CPU stack message queue is larger than the predetermined number.

* * * * *